United States Patent
Fischer et al.

(10) Patent No.: US 11,527,012 B2
(45) Date of Patent: Dec. 13, 2022

(54) VEHICLE POSE DETERMINATION

(71) Applicant: Ford Global Technologies, LLC, Dearborn, MI (US)

(72) Inventors: John Michael Fischer, San Francisco, CA (US); Punarjay Chakravarty, Campbell, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 734 days.

(21) Appl. No.: 16/502,393

(22) Filed: Jul. 3, 2019

(65) Prior Publication Data

US 2021/0004983 A1    Jan. 7, 2021

(51) Int. Cl.
| | |
|---|---|
| *G01C 22/00* | (2006.01) |
| *G05D 1/00* | (2006.01) |
| *G06T 7/73* | (2017.01) |
| *G06T 7/246* | (2017.01) |
| *G05D 1/02* | (2020.01) |
| *G08G 1/04* | (2006.01) |

(52) U.S. Cl.
CPC ............. *G06T 7/75* (2017.01); *G05D 1/0088* (2013.01); *G05D 1/0231* (2013.01); *G06T 7/251* (2017.01); *G08G 1/04* (2013.01); *G05D 2201/0213* (2013.01); *G06T 2200/04* (2013.01); *G06T 2207/20084* (2013.01); *G06T 2207/30244* (2013.01); *G06T 2207/30252* (2013.01)

(58) Field of Classification Search
CPC ....... G06T 7/75; G06T 7/251; G06T 2200/04; G06T 2207/20084; G06T 2207/30244; G06T 2207/30252; G05D 1/0088; G05D 1/0231; G05D 2201/0213; G08G 1/04
USPC .......................................................... 701/28
See application file for complete search history.

(56) References Cited

U.S. PATENT DOCUMENTS

| | | | |
|---|---|---|---|
| 8,379,014 | B2 | 2/2013 | Wiedemann et al. |
| 9,830,715 | B2 | 11/2017 | Benhimane et al. |
| 9,909,855 | B2 | 3/2018 | Becker et al. |
| 2002/0009222 | A1* | 1/2002 | McGibbon .............. G06T 13/40 |
| | | | 382/154 |
| 2015/0314893 | A1* | 11/2015 | Rembala .............. B64G 1/1078 |
| | | | 244/172.4 |
| 2017/0053538 | A1* | 2/2017 | Samarasekera ...... G06K 9/6267 |
| 2018/0188032 | A1* | 7/2018 | Ramanandan .......... G01S 19/52 |
| 2018/0188043 | A1 | 7/2018 | Chen et al. |
| 2018/0192035 | A1 | 7/2018 | Dabeer et al. |
| 2020/0217972 | A1* | 7/2020 | Kim ....................... G01C 21/30 |

FOREIGN PATENT DOCUMENTS

WO    2018184757 A1    10/2018

\* cited by examiner

*Primary Examiner* — Mahmoud S Ismail
(74) *Attorney, Agent, or Firm* — Frank A. MacKenzie; Bejin Bieneman PLC

(57) ABSTRACT

A computer, including a processor and a memory, the memory including instructions to be executed by the processor to determine a vehicle six degree of freedom (DoF) pose based on an image where the six DoF pose includes x, y, and z location and roll, pitch, and yaw orientation and transform the vehicle six DoF pose into global coordinates based on a camera six DoF pose. The instructions can include further instructions to communicate to the vehicle the six DoF pose in global coordinates.

20 Claims, 7 Drawing Sheets

200

VEHICLE POSE DETERMINATION

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
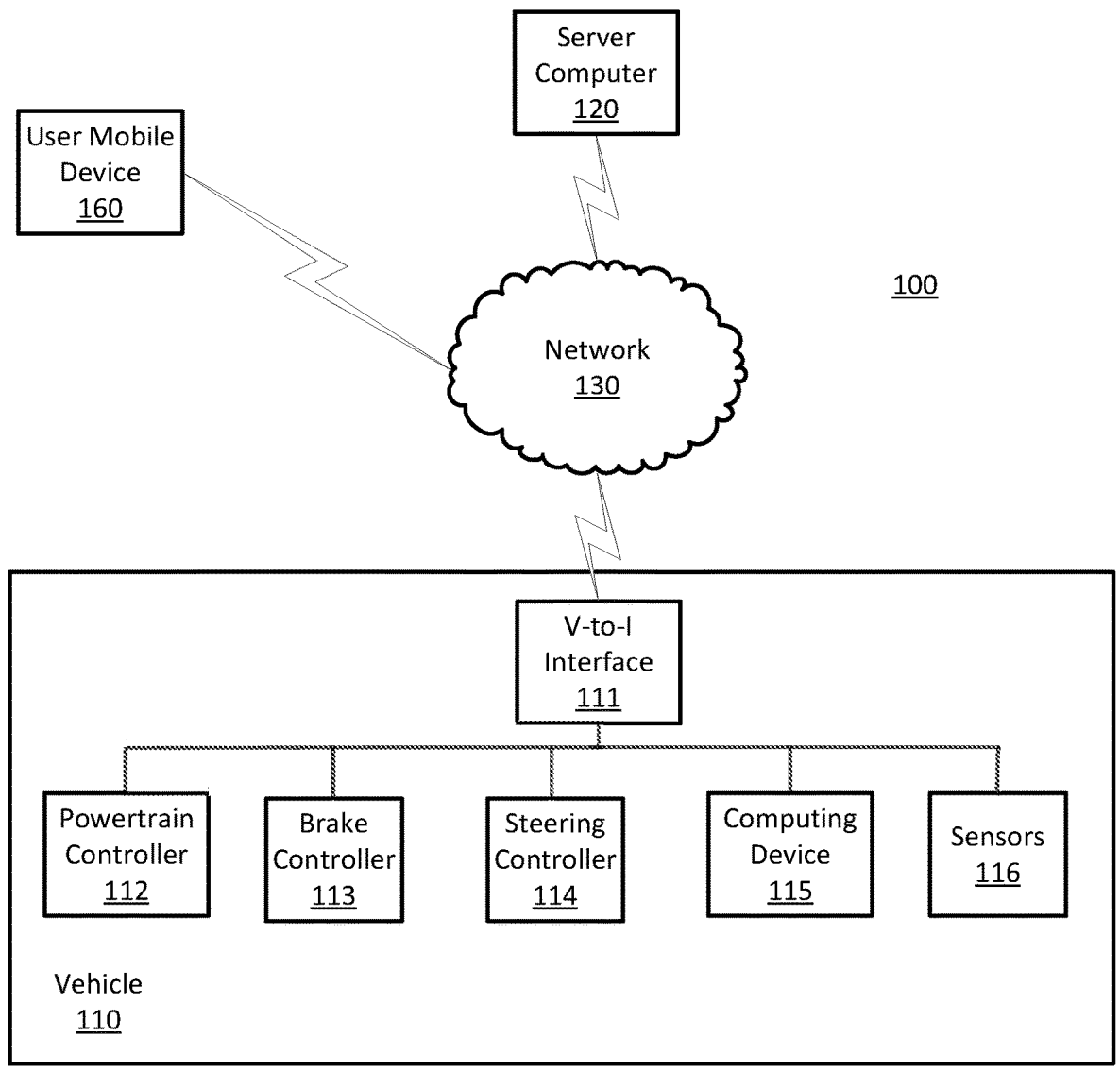
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of an information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle so as to travel along the path. The data regarding the external environment can include a six degree of freedom (DoF) pose of the vehicle with respect to an environment around the vehicle. Six DoF pose is defined as a location and an orientation in three-dimensional space measured with respect to x, y, and z orthogonal axes and by rotations roll, pitch, and yaw about the x, y, and z axes. Six DoF pose corresponds to translation t and rotation R with respect to the x, y, and z orthogonal axes. Six DoF pose of a vehicle and other vehicles in an environment around a vehicle can be used by a computing device in the vehicle to operate the vehicle. Operating a vehicle based on the six DoF pose of a vehicle can include determining a vehicle path with respect to a roadway, for example. In examples that include a six DoF pose of another vehicle, a vehicle path can be determined that avoids the other vehicle.

Disclosed herein is method including determining a vehicle six DoF pose based on an image where the vehicle six DoF pose includes x, y, and z location and roll, pitch, and yaw orientation, transforming the vehicle six DoF pose into global coordinates based on a camera six DoF pose and communicating to a vehicle the vehicle six DoF pose in the global coordinates. The vehicle six DoF pose can be determined by determining features and dimensions based on computer-aided design (CAD) data, physical measurements and machine vision techniques. Corresponding vehicle features can be determined based on an image using machine vision techniques and transforming the vehicle features into the nominal features using a perspective-n-points algorithm to determine the six DoF pose. The machine vision techniques can include edge detection and locations and angles at which two or more edges join. The perspective-n-points algorithm can determine a six DoF pose for a camera with respect to the vehicle features by iteratively fitting n vehicle features to a three-dimensional (3D) vehicle model, and then determines the vehicle six DoF pose for the vehicle based on a determined real-world six DoF pose of the camera.

The vehicle six DoF pose can be determined by inputting a video image to a trained convolutional neural network which determines rotation and translation of the vehicle in the video image. The convolutional neural network can be trained using a plurality of images including images of the vehicle at a plurality of vehicle six DoF poses with respect to a camera and corresponding ground truth. The corresponding ground truth can be determined by determining corresponding vehicle features using machine vision techniques and transforming the vehicle features into the nominal features using a perspective-n-points algorithm to determine the ground truth. The global coordinates can be determined relative to latitude, longitude and altitude coordinate axes. The vehicle six DoF pose can be transformed into global coordinates based on projective geometry and including a six DoF pose of the camera, and magnification of a lens included in the camera. The vehicle can be operated by determining a vehicle path based on the vehicle six DoF pose. The vehicle can be operated along the vehicle path by controlling one or more of vehicle powertrain, vehicle steering, and vehicle brakes. The vehicle six DoF pose can be determined for another vehicle. The method of claim 13, further comprising operating the vehicle based determining a vehicle path based on the six DoF pose of the other vehicle.

Further disclosed is a computer readable medium, storing program instructions for executing some or all of the above method steps. Further disclosed is a computer programmed for executing some or all of the above method steps, including a computer apparatus, programmed to determine a vehicle six DoF pose based on an image where the vehicle six DoF pose including x, y, and z location and roll, pitch, and yaw orientation, transform the vehicle six DoF pose into global coordinates based on a camera six DoF pose and communicate to a vehicle the vehicle six DoF pose in the global coordinates. The vehicle six DoF pose can be determined by determining features and dimensions based on computer-aided design (CAD) data, physical measurements and machine vision techniques. Corresponding vehicle features can be determined based on an image using machine vision techniques and transforming the vehicle features into the nominal features using a perspective-n-points algorithm to determine the six DoF pose. The machine vision techniques can include edge detection and locations and angles at which two or more edges join. The perspective-n-points algorithm can determine a six DoF pose for a camera with respect to the vehicle features by iteratively fitting n vehicle features to a three-dimensional (3D) vehicle model, and then determines the vehicle six DoF pose for the vehicle based on a determined real-world six DoF pose of the camera.

The instructions can include further instructions to determine vehicle six DoF pose by inputting a video image to a trained convolutional neural network which determines rotation and translation of the vehicle in the video image. The convolutional neural network can be trained using a plurality of images including images of the vehicle at a plurality of vehicle six DoF poses with respect to a camera and corresponding ground truth. The corresponding ground truth can be determined by determining corresponding vehicle features using machine vision techniques and transforming the vehicle features into the nominal features using a perspective-n-points algorithm to determine the ground truth. The global coordinates can be determined relative to latitude, longitude and altitude coordinate axes. The vehicle six DoF pose can be transformed into global coordinates based on projective geometry and including a six DoF pose of the camera, and magnification of a lens included in the camera. The vehicle can be operated by determining a vehicle path based on the vehicle six DoF pose. The vehicle can be operated along the vehicle path by controlling one or more of vehicle powertrain, vehicle steering, and vehicle brakes. The vehicle six DoF pose can be determined for another vehicle. The method of claim 13, further comprising operating the vehicle based determining a vehicle path based on the six DoF pose of the other vehicle.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive information regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114.

A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
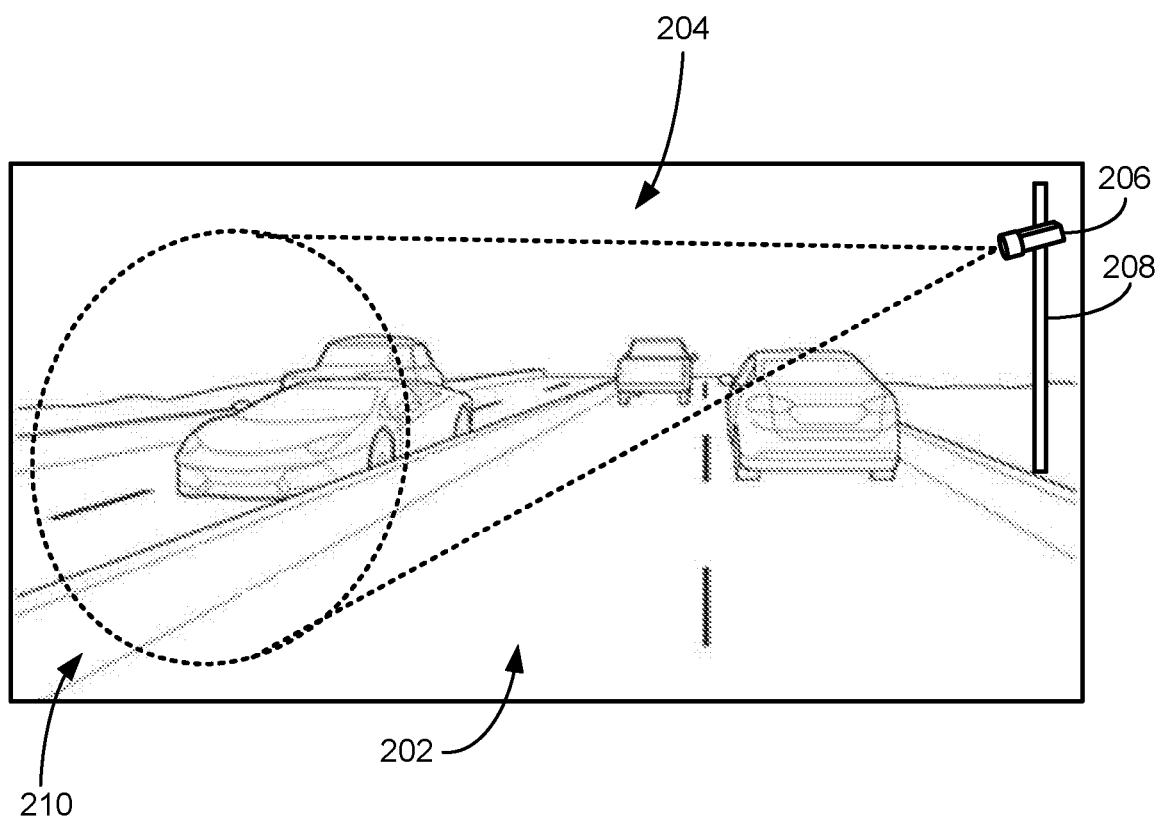
FIG. 2 is a diagram of an example traffic scene.

FIG. 2 is an example diagram of a traffic scene 200. Traffic scene 200 includes a roadway 202, vehicles 204, and a video camera 206. Video camera 206 can be mounted on a pole 208 or other platform such as a building or tower for example, to make video camera 206 a stationary video camera 206. Making video camera 206 stationary permits a traffic infrastructure system 100 to acquire data regarding the six DoF pose of the video camera 206 with respect to a 3D global coordinate system like latitude, longitude and altitude. The six DoF pose of the video camera 206 can be combined with data regarding the location of a field of view 210 of video camera 206 with respect to traffic scene 200 including roadway 202, as described further below. For example, data regarding the magnification of a lens included in video camera 206 can be combined with map data regarding the locations of portions of traffic scene 200 in field of view 210 to determine a transformation based on projective geometry that transforms six DoF poses in pixel coordinates to global coordinates. A transformation to transform pixel coordinates to global coordinates can also be determined by acquiring image data regarding fiducial markers in the field of view 210 and measuring the fiducial markers, for example. Determining a transform to transform pixel coordinates to global coordinates for a stationary video camera 206 can be described as calibrating the stationary video camera 206. In describing techniques herein, red, green, and blue (RGB) color images will be used as example image data acquired by a stationary video camera 206, however, grayscale, near infrared or far infrared (IR) video data can be used to achieve like results.

Figure 3:
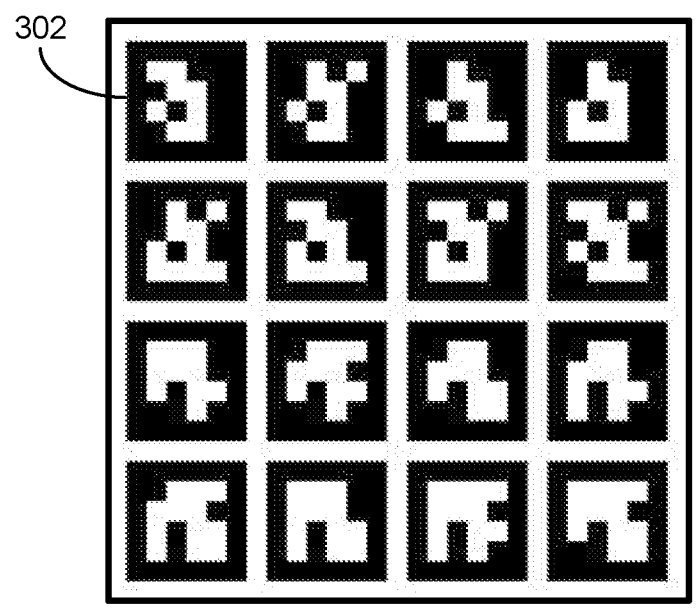
FIG. 3 is a diagram of example fiducial marks.

FIG. 3 is a diagram of an example fiducial marker 300. A fiducial marker 300 can include a number of ArUco fiducial marks 302, for example. ArUco fiducial marks 302 are two-dimensional (2D) patterns from a library of fiducial marks described at www.uco.es/grupos/ava/node/26, "Aplicaciones de la Vision Artificial", University of Cordoba, Spain, May 15, 2019. ArUco fiducial marks include machine vision software that can determine a 3D six DoF pose in pixel coordinates for each ArUco fiducial mark 302 included in a fiducial marker 300 by processing a 2D video image of the fiducial marker 300. By determining a six DoF pose for each ArUco fiducial mark 302 included in a video image of a fiducial marker 300, the machine vision software can determine an accurate six DoF pose in spite of missing data caused by partially obscuring the fiducial marker 300, for example.

A fiducial maker 300 can be used to determine a six DoF pose of a vehicle using a calibrated stationary video camera 206 by attaching the fiducial marker 300 at a measured location and orientation to a vehicle 110. For example, a vehicle 110 can have a fiducial marker 300 attached to the top of the vehicle. When the vehicle 110 passes into the field of view 210 of a calibrated stationary video camera 206, a video image of the vehicle including the fiducial marker 300 can be acquired and a 3D pose in pixel coordinates of the fiducial marker 300 can be determined using machine vision software as described above. Because the relationship between the fiducial marker 300 and the vehicle 110 is determined when the fiducial marker 300 is attached to the vehicle 110, the six DoF pose of the vehicle 110 in pixel coordinates can be determined. Because the stationary video camera 206 is calibrated as described above, the six DoF pose of the vehicle 110 in pixel coordinates can be transformed into global coordinates. The six DoF pose of a vehicle 110 can be downloaded to a computing device 115 in a vehicle 110 and used to operate the vehicle 110.

A six DoF pose of a vehicle 110 determined by processing a video image acquired by a stationary video camera 206 and downloaded from a traffic information system 100 can be one of several sources of six DoF pose data acquired by a computing device 115 in a vehicle 110. For example, vehicle 110 can include location sensors 116 such as a GPS and an inertial measurement unit (IMU) that can measure a six DoF pose for a vehicle 110. Vehicle 110 can include video, lidar and radar sensors that acquire data regarding the environment around a vehicle 110 that can be combined with map data to determine six DoF pose data for a vehicle 110. Six DoF pose data from a plurality of sources can be combined to provide redundancy that improves the reliability and accuracy of the six DoF pose. Techniques described herein improve the determination of six DoF pose information by determining features based on computer-aided design (CAD) files that describe a vehicle 110 and processing corresponding features determined in video images acquired by a stationary video camera 206. The corresponding features determined based on video images can be used to determine a six DoF pose for the vehicle 110 without requiring a fiducial mark 300.

Figure 4:
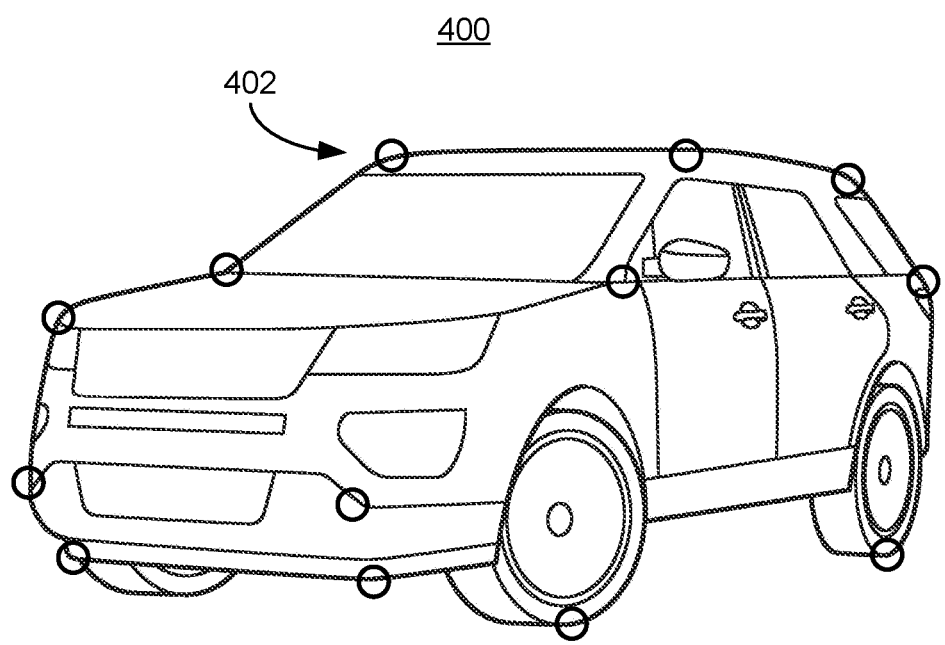
FIG. 4 is a diagram of an example vehicle including features.

FIG. 4 is a diagram of an example rendering of CAD data corresponding to a synthetic vehicle image 400, illustrated as a black and white line drawing to conform to Patent Office regulations. Rendering of CAD data is a process that includes determining two-dimensional (2D) image data by calculating the appearance of surfaces included in the CAD data based on user selected illumination sources and a synthetic camera aperture. Light rays can be traced from an illumination source, reflected off surfaces of the vehicle image and captured by a synthetic camera aperture. A synthetic camera aperture is a mathematical model of a camera lens and detector combination that can acquire data from traced light rays to form an image, thereby imitating the operation of a real world camera and lens. Rendering CAD data can produce a 2D synthetic vehicle image 400 corresponding to a six DoF pose of a vehicle determined with respect to a synthetic camera, for example.

An output synthetic vehicle image 400 can be processed using machine vision techniques to determine vehicle features 402, illustrated in FIG. 4 as circles. Machine vision techniques to determine vehicle features 402 include edge detection algorithms and feature detection algorithms that detect configurations of edges by determining geometric edge configurations. Geometric edge configurations can include locations and angles at which two or more edges join, for example. Vehicle features 402 can be used to determine a six DoF pose for a vehicle by determining locations and dimensions of vehicle features 402, where dimensions include distances and angles between the vehicle features 402. The locations of identified vehicle features 402 can be physically measured with respect to six DoF poses of the vehicle as determined based on the CAD data and synthetic camera location. By rendering a plurality of vehicle images at a variety of six DoF poses and processing the rendered vehicle images to detect vehicle features, the correspondence between vehicle features 402 identified in a synthetic vehicle image 300 and 3D locations of the features in CAD data can be determined. The locations of vehicle features 402 are canonical locations which can be determined by physical measurement of the vehicle features 402 with respect to a user input principle axis for the vehicle. A principle axis for a vehicle can be an axis passing through a center of mass of the vehicle in the principal direction of travel, e.g. the direction the vehicle would travel with wheels centered, for example. This correspondence can be used to process acquired images of vehicles to determine a six DoF pose of the vehicle without requiring a fiducial marker 300 with techniques described herein.

Figure 5:
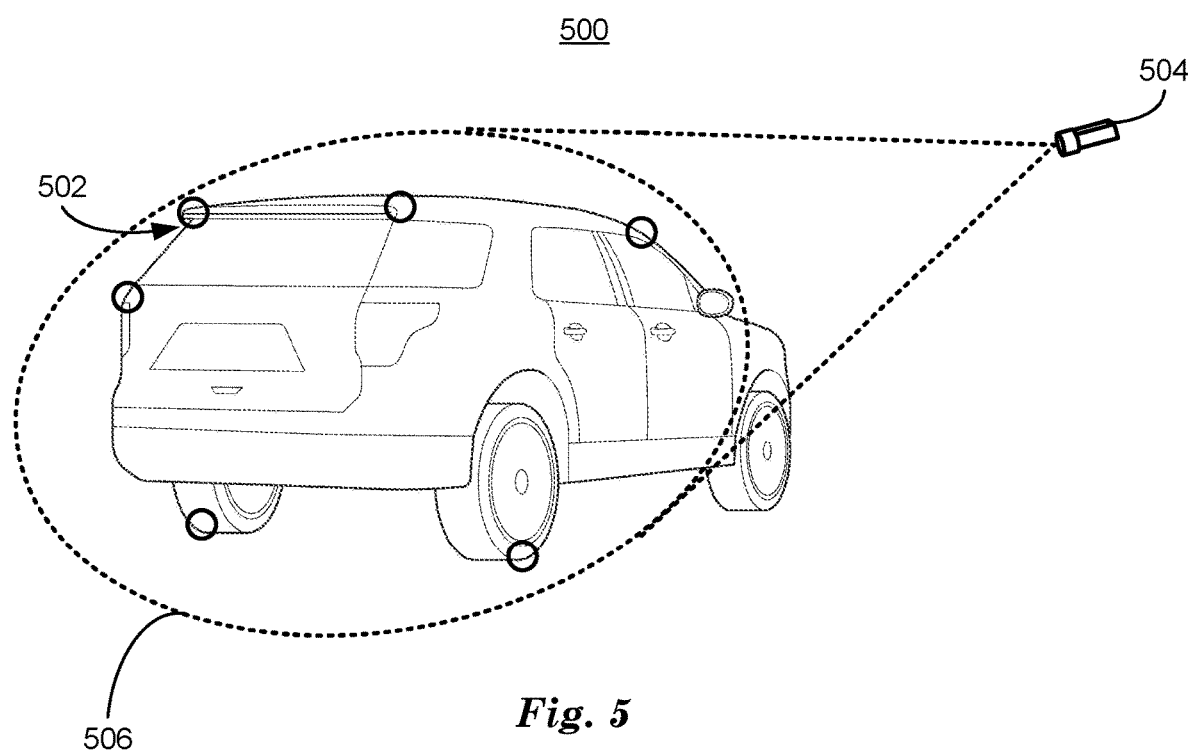
FIG. 5 is a diagram of an example vehicle and stationary video camera.

FIG. 5 is a diagram of a red, green, and blue (RGB) color image of a vehicle 500, illustrated as a black and white line drawing to conform to Patent Office regulations. RGB color image of a vehicle 500 can be acquired by a stationary video camera 504 having a field of view 506 that includes portions of a vehicle 500, for example. The RGB color image of a vehicle 500 can be processed by a computing device to determine vehicle image features 502 illustrated in FIG. 5 as circles, using machine vision techniques as discussed above in relation to FIG. 4. By processing the RGB color image of a vehicle 500 using similar machine vision techniques as were used to detect vehicle features 402, detected vehicle image features 502 will be similar to vehicle features 402 detected on rendered CAD data. A six DoF pose for vehicle 500 can be determined by solving the following perspective-n-point projection equation:

$$R, t = \underset{R,t}{\operatorname{argmin}} \sum_j \left\| u_j - \prod (RX_j + t) \right\|^2 \qquad (1)$$

Equation (1) calculates rotation R, measured in roll, pitch, and yaw, and translation t, measured in x, y, and z by determining a minimum with respect to R and t. The minimum is calculated by summing the squared differences between the n locations of vehicle image features 502 $u_j$, where $j \in \{1, \ldots n\}$, and n locations of CAD data vehicle features 402 $X_j$, where the vehicle features 402 $X_j$ are canonical features measured with respect to a principle axis of the vehicle as discussed above in relation to FIG. 4.

Equation (1) selects values of R and t which minimize the difference between the locations of detected vehicle image features 502 $u_j$ and locations of CAD data vehicle features 402 $X_j$ rotated and translated to most closely match the detected vehicle image features 502 $u_j$ using non-linear least squares techniques including the Levenberg-Marquardt algorithm. Levenberg-Marquart techniques can determine a minimum value for an equation by performing non-linear least squares curve fitting, where the algorithm interpolates between Gauss-Newton techniques and gradient descent techniques to determine a local minimum for the curve even if the algorithm starts very far from the actual minimum value. At each step the vehicle image features 502 $u_j$ are fit to a vehicle model that includes CAD data vehicle features 402 $X_j$ rotated and translated to most closely match the detected vehicle image features 502 $u_j$. The order in which the steps are systematically varied can depend upon the relative minimum values of the steps to efficiently determine an overall minimum value.

The values of R and t determined by equation (1) correspond to the six DoF pose of the vehicle in the RGB color image of a vehicle 500 measured with respect to a six DoF pose of the stationary video camera 504. The six DoF pose of the vehicle can be transformed into global coordinates by combining corresponding roll, pitch, and yaw and x, y, and z elements from the vehicle six DoF pose with the same elements from the camera six DoF pose and data regarding the field of view 506 measured in global coordinates to yield the six DoF pose of the vehicle in global coordinates. Techniques described herein improve the determination of a six DoF pose for a vehicle based on video data by eliminating the requirement for a fiducial marker 300.

Figure 6:
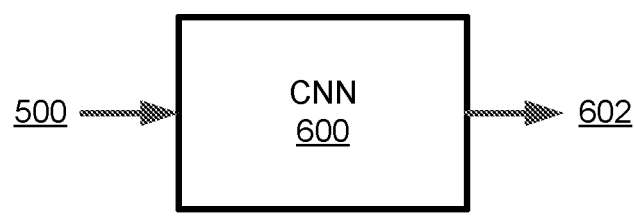
FIG. 6 is a diagram of an example convolutional neural network.

FIG. 6 is a diagram of an example convolutional neural network (CNN) 600. A CNN 600 is a software program that can be implemented on a computing device that can be trained to input an RGB color image of a vehicle 500 and output a six DoF vehicle pose (R, t) 602 in response. A CNN 600 includes a plurality of convolutional layers that extract hidden features from input RGB color image of a vehicle 500 which are passed to a plurality of fully-connected layers that transform the hidden features into a six DoF vehicle pose (R, t) 602. A CNN 600 can be trained to perform six DoF vehicle pose (R, t) 602 processing by processing a plurality of RGB color images of vehicles 500 with techniques described above in relation to FIG. 5 to determine a six DoF vehicle pose (R, t) 602 for each RGB color image of a vehicle 500. The determined six DoF pose is defined as "ground truth", because it was determined independently from the CNN 600. CNN 600 is trained by inputting an RGB color image of a vehicle 500 and backpropagating results to be compared with the ground truth six DoF pose to determine a loss function. Training the CNN 600 includes determining parameters for convolutional and fully-connected layers that minimize the loss function. When trained, a CNN 600 can input an RGB color image of a vehicle 500 and output a six DoF pose (R, t) 602 in coordinates relative to a stationary video camera 504. As discussed above in relation to FIG. 5, the six DoF pose 602 can be transformed into global coordinates by combining the output six DoF pose 602 with a six DoF pose of the stationary video camera 504 and data regarding the field of view 504.

Figure 7:
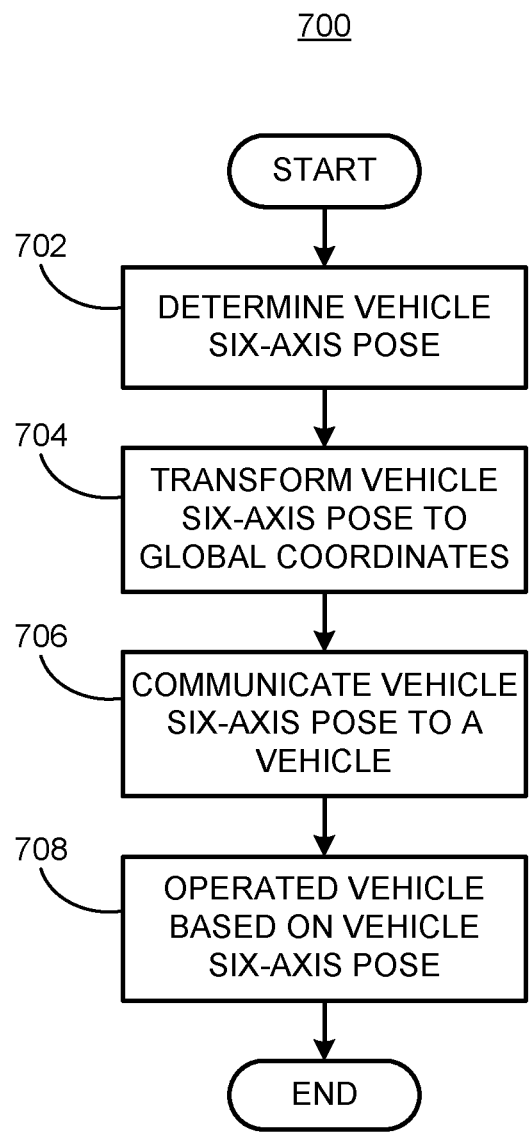
FIG. 7 is a flowchart diagram of an example process to determine vehicle six degree of freedom (DoF) pose.

FIG. 7 is a diagram of a flowchart, described in relation to FIGS. 1-5, of a process 700 for operating a vehicle based on six DoF pose data. Process 700 can be implemented by a processor of computing device, taking as input information from sensors, and executing commands, and outputting object tracking information, for example. Process 700 includes multiple blocks taken in the disclosed order. Process 700 could alternatively or additionally include fewer blocks or can include the blocks taken in different orders.

Process 700 begins at block 702, where a computing device determines a six DoF pose of a vehicle (R, t) based on an input RGB color image of a vehicle 500 as discussed in relation to FIGS. 5 and 6, above. The six DoF pose of the vehicle can be determined based on vehicle features 502, corresponding features based on a CAD model of the vehicle and equation (1). A six DoF pose can also be determined by processing the RGB color image of a vehicle 500 with a trained CNN 600.

At block 704 the computing device can transform the six DoF pose of the vehicle (R, t) into global coordinates based on a six DoF pose of the stationary camera 504 and a magnification of a lens that forms the field of view 506. Transforming the six DoF pose of the vehicle (R, t) into global coordinates permits the six DoF pose of the vehicle (R, t) to be determined with respect to a roadway 202, for example.

At block 706 the six DoF pose of the vehicle (R, t) in global coordinates is communicated to a vehicle 110. The six DoF pose of the vehicle (R, t) in global coordinates can be determined by a traffic information system 100, for example, and downloaded to a vehicle 110 via a network 130. In an example, the six DoF pose of the vehicle (R, t) can belong to the vehicle 110 that receives the communication. A computing device 115 in the receiving vehicle 110 can combine the received six DoF pose data with other orientation and location data determined based on data from sensors 116 included in the vehicle 110 as discussed above to improve the accuracy and timeliness of the six DoF pose data. In other examples, the six DoF pose data can refer to another vehicle in an environment around a vehicle 110.

At step 708 a vehicle 110 can operate based on the received six DoF pose (R, t) data. A computing device 115 can determine a vehicle path upon which to operate the vehicle 110 based on the location and orientation included in the six DoF pose of the vehicle (R, t). In examples where the six DoF pose of the vehicle (R, t) refers to another vehicle, computing device 115 can determine a vehicle path that avoids the other vehicle based on the location and orientation of the vehicle from the six DoF pose data. The computing device 115 can operate the vehicle 110 on the vehicle path by controlling vehicle powertrain, steering and brakes via controllers 112, 113, 114. Following block 708 process 700 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A first computer, comprising a first processor and a first memory, the first memory including first instructions to be executed by the first processor to:
    determine a first six DoF pose for a vehicle based on an image acquired by a stationary camera, where the first six DoF pose includes x, y, and z location and roll, pitch, and yaw orientation;
    transform the first six DoF pose into global coordinates based on a second six DoF pose for the stationary camera; and
    communicate the first six DoF pose in the global coordinates to a second computer included in the vehicle, the second computer including a second processor and a second memory, the second memory including second instructions to operate the vehicle by determining a vehicle path based on the first six DoF pose.

2. The computer of claim 1, the instructions further including instructions to determine the vehicle six DoF pose by determining features and dimensions based on computer-aided design (CAD) data, physical measurements and machine vision techniques.

3. The computer of claim 2, the instructions further including instructions to determine corresponding vehicle features based on an image using machine vision techniques and transforming the vehicle features into the nominal features using a perspective-n-points algorithm to determine the six DoF pose.

4. The computer of claim 3, wherein the perspective-n-points algorithm determines a six DoF pose for a camera with respect to the vehicle features by iteratively fitting n vehicle features to a three-dimensional (3D) vehicle model, and then determines the vehicle six DoF pose based on a determined real-world camera six DoF pose.

5. The computer of claim 4, wherein rotation and translation values that fit the vehicle features to the three-dimensional (3D) vehicle model are minimized using non-linear least squares techniques including the Levenberg-Marquardt algorithm.

6. The computer of claim 1, the instructions further including instructions to determine the vehicle six DoF pose by inputting a video image to a trained convolutional neural network which determines rotation and translation of the vehicle in the video image.

7. The computer of claim 6, wherein the convolutional neural network is trained using a plurality of images including images of the vehicle at a plurality of vehicle six DoF poses with respect to a camera and corresponding ground truth.

8. The computer of claim 1, wherein the global coordinates are determined relative to latitude, longitude and altitude coordinate axes.

9. The computer of claim 1, the instructions further including instructions to transform the vehicle six DoF pose into global coordinates based on projective geometry and including a camera six DoF pose of the camera and magnification of a lens included in the camera.

10. The second computer of claim 1, the second instructions further including instructions to operate the vehicle along the vehicle path by controlling one or more of vehicle powertrain, vehicle steering, and vehicle brakes.

11. A method, comprising:
    determining a first six DoF pose for a vehicle based on an image acquired by a stationary camera, where the six DoF pose includes x, y, and z location and roll, pitch, and yaw orientation;
    transforming the first six DoF pose into global coordinates based on a second six DoF pose for the stationary camera; and
    communicating the first six DoF pose in the global coordinates to the vehicle and operating the vehicle by determining a vehicle path based on the first six DoF pose.

12. The method of claim 11, further comprising determining the vehicle six DoF pose by determining features and dimensions based on computer-aided design (CAD) data, physical measurements and machine vision techniques.

13. The method of claim 12, further comprising determining corresponding vehicle features based on an image using machine vision techniques and transforming the vehicle features into the nominal features using a perspective-n-points algorithm to determine the six DoF pose.

14. The method of claim 13, wherein the perspective-n-points algorithm determines a six DoF pose for a camera with respect to the vehicle features by iteratively fitting n vehicle features to a three-dimensional (3D) vehicle model, and then determines the vehicle six DoF pose for the vehicle based on a determined real-world six DoF pose of the camera.

15. The method of claim 14, wherein rotation and translation values that fit the vehicle features to the three-dimensional (3D) vehicle model are minimized using non-linear least squares techniques including the Levenberg-Marquardt algorithm.

16. The method of claim 11, further comprising determining the vehicle six DoF pose by inputting a video image to a trained convolutional neural network which determines rotation and translation of the vehicle in the video image.

17. The method of claim 16, wherein the convolutional neural network is trained using a plurality of images including images of the vehicle at a plurality of vehicle six DoF poses with respect to a camera and corresponding ground truth.

18. The method of claim 11, wherein the global coordinates are determined relative to latitude, longitude and altitude coordinate axes.

19. The method of claim 11, further comprising transforming the vehicle six DoF pose into global coordinates based on projective geometry and including a six DoF pose of the camera, and magnification of a lens included in the camera.

20. The method of claim 11, further comprising operating the vehicle along the vehicle path by controlling one or more of vehicle powertrain, vehicle steering, and vehicle brakes.

* * * * *